United States Patent
Birner

(10) Patent No.: US 7,414,828 B2
(45) Date of Patent: Aug. 19, 2008

(54) MODULAR CURRENT DISTRIBUTOR FOR HIGH CURRENTS

(75) Inventor: Markus Birner, Zirndorf (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 31 days.

(21) Appl. No.: 11/585,562

(22) Filed: Oct. 24, 2006

(65) Prior Publication Data
US 2007/0035914 A1    Feb. 15, 2007

Related U.S. Application Data

(63) Continuation of application No. PCT/EP2005/003700, filed on Apr. 8, 2005.

(30) Foreign Application Priority Data
May 24, 2004    (DE)    ........................ 20 2004 008 141

(51) Int. Cl.
*H05K 7/14*    (2006.01)
*H02B 1/04*    (2006.01)

(52) U.S. Cl. .................. 361/624; 361/605; 361/611; 361/622; 361/627; 361/634; 361/648; 361/652; 361/658; 174/68.2; 174/70 B; 174/71 B; 174/88 B; 363/142; 363/144; 363/147

(58) Field of Classification Search ......... 361/605–658, 361/673, 675; 439/82, 83, 709, 715, 716; 174/68.2, 70 B, 71 B, 88 B, 72; 363/142, 363/144, 147
See application file for complete search history.

(56) References Cited

U.S. PATENT DOCUMENTS

| 3,211,960 | A | * | 10/1965 | Dorfman et al. ............ 361/673 |
| 4,713,728 | A | * | 12/1987 | Raabe et al. ................ 361/652 |
| 4,931,903 | A | * | 6/1990 | Cole .......................... 361/645 |
| 5,995,362 | A | * | 11/1999 | Morel et al. ................ 361/647 |
| 6,002,580 | A | | 12/1999 | LaVantine et al. |
| 6,062,914 | A | * | 5/2000 | Fasano ...................... 439/716 |
| 6,191,948 | B1 | | 2/2001 | Beyer |
| 6,229,692 | B1 | * | 5/2001 | Stendardo et al. ........... 361/627 |
| 6,315,580 | B1 | * | 11/2001 | Hurtubise et al. ............ 439/82 |
| 6,317,311 | B1 | | 11/2001 | Middlehurst et al. |
| 6,530,811 | B1 | * | 3/2003 | Padulo et al. ............... 439/716 |
| 6,560,123 | B1 | * | 5/2003 | de Varennes et al. ........ 361/807 |
| 2002/0121952 | A1 | * | 9/2002 | Castonguay et al. ........ 335/132 |

* cited by examiner

Primary Examiner—Michael V Datskovskiy
(74) Attorney, Agent, or Firm—Laurence A. Greenberg; Werner H. Stemer; Ralph E. Locher

(57) ABSTRACT

A current distributor includes a common, uninterrupted first main busbar as a main current supply and a number of current distributor modules which are each associated with a respective circuit breaker and can be disposed in a row along the main busbar. The current distributor module or each current distributor module has a first connection line for supplying current to a load circuit. The current distributor module or each current distributor module has a housing, a slot formed on a front side of the housing for plugging on an associated circuit breaker, and a first channel which passes through the housing in a transverse direction for accommodating the first main busbar. A first contact opening of the slot corresponds to the first channel and a second contact opening of the slot corresponds to a housing receptacle for a connection socket of the first connection line.

19 Claims, 5 Drawing Sheets

MODULAR CURRENT DISTRIBUTOR FOR HIGH CURRENTS

CROSS-REFERENCE TO RELATED APPLICATIONS

This is a continuing application, under 35 U.S.C. §120, of copending International Application No. PCT/EP2005/003700, filed Apr. 8, 2005, which designated the United States; this application also claims the priority, under 35 U.S.C. §119, of German Patent Application DE 20 2004 008 141.5, filed May 24, 2004; the prior applications are herewith incorporated by reference in their entirety.

BACKGROUND OF THE INVENTION

Field of the Invention

The invention relates to a current distributor.

A current distributor is used for branching off current from a main current line to a number of load circuits. Such a current distributor, as is known, for example, from U.S. Pat. Nos. 6,317,311 B1, 6,560,123 B1 and 6,002,580, usually has a number of circuit breakers which corresponds to the number of load circuits. In each case, one of the circuit breakers is connected into a connection line, branching off from the main current line, for a load circuit and isolates the corresponding load circuit from the main current line in the event of an excess current. A current distributor is used to reduce the circuitry complexity for a conventional current distribution system.

A current distributor known from U.S. Pat. No. 6,191,948 B1 is formed from a number of current distributor modules, each of which comprises connection lines for supplying current to two load circuits, in each case one slot for plugging on a circuit breaker being connected into each connection line. Continuous, rigid busbars are provided as the main current line, along which busbars the current distributor modules can be arranged in a row.

SUMMARY OF THE INVENTION

It is accordingly an object of the invention to provide a modular current distributor, which overcomes the hereinafore-mentioned disadvantages of the heretofore-known devices of this general type, which can advantageously be used in particular for high currents and which can be produced and installed in an economical manner.

With the foregoing and other objects in view there is provided, in accordance with the invention, a modular current distributor, comprising a (first) main busbar serving as a main current supply or feed and a number of current distributor modules, i.e. at least one current distributor module, but preferably a plurality of current distributor modules. In this case, each of the current distributor modules, which can be disposed in a row along the uninterrupted main busbar, is associated with one respective circuit breaker and includes a (first) connection line, through the use of which current can be branched off out of the main busbar to a load circuit. The current distributor module or each current distributor module includes a flat housing, a slot for plugging on a circuit breaker being formed on the front side of the housing, and a (first) channel passing through the housing in the transverse direction, i.e. from end side to end side, and being used for accommodating the first main busbar.

In this case, the channel is disposed with respect to the slot in such a way that a first contact opening of the slot corresponds to the channel, i.e. the channel is accessible from outside the housing through the first contact opening. A second contact opening of the slot corresponds to a housing receptacle for a connection socket of the first connection line.

The modular construction of the current distributor makes a high degree of prefabrication possible and therefore results in comparatively low production and fitting or installation costs. In particular, the current distributor can be matched in a particularly simple manner to a desired number of connecting load circuits by placing a corresponding number of current distributor modules next to one another in a row. As a result of the flat shape of each current distributor module, in this case these modules can be attached to one another in a similar manner to modular devices. As a result, a particularly compact construction of the current distributor is achieved. The main busbar in this case passes through the channels of the current distributor modules disposed next to one another in a row, with the channels being disposed in such a way that they are aligned with one another, therefore forming a common current feed.

In accordance with another feature of the invention, the current distributor includes a second main busbar for jointly feeding back the current fed into the load circuits. In this embodiment, the current distributor module or each current distributor module has a second channel for the purpose of accommodating this second main busbar, which passes through the housing likewise in the transverse direction. Furthermore, the current distributor module or each current distributor module includes a second connection line for the purpose of feeding current back out of the load circuit. The second connection line protrudes into the second channel for the purpose of making contact with the second main busbar.

Particularly simple fitting or installation of the current distributor is preferably achieved by the fact that the channel or each channel is disposed on a side face of the housing and can be uncovered and covered through the use of a cover towards this side face. In particular, the narrow housing sides, which adjoin the front face, in particular the upper side and the lower side of the housing, are referred to as the side faces of the housing. A part of the housing wall which can be fixed detachably to the housing is referred to as the cover. The cover can be completely removed from the housing.

However, the cover is preferably in the form of a hinged cover plate, which is fixed to the housing through the use of a film hinge. The above-described construction of the channels at the edge of the housing allows for simplified fitting or installation of the current distributor, especially since the channel or each channel of each current distributor module is accessible from the outside when the cover is open. In this manner, it is possible for the busbar or each busbar to be inserted in a particularly simple manner into the associated channel or the aligned channel sections of the current distributor modules, which are disposed next to one another in a row, from the outside of the housing. Due to the cover being simply fixed to the respective housing, the busbar is protected in this manner in terms of electric shock in the interior of the housing.

In one embodiment which is particularly advantageous with regard to requiring comparatively little outlay for materials and complexity in terms of fitting or installation, the housing of the current distributor module or each current distributor module is constructed to be open towards an end side. The housing is therefore approximately in the form of a shell and includes a housing base, which closes off the housing towards one end side, and side walls extending in the transverse direction. In order to reinforce the housing while at the same time using comparatively little material, it is also advantageous to provide intermediate housing walls extending in the transverse direction within the frame formed by the side walls. The housing having this construction is therefore in the form of a letter case, for example.

In the fitted state, the open end side of a current distributor module is closed off by the housing base of an adjacent current distributor module. In order to cover the end side of an outermost current distributor module in a row of current distributor modules, a termination plate is preferably provided which can be placed onto this end side. This termination plate in this case is expediently provided with one or more leadthroughs, each of which is aligned with a respective channel of the adjacent current distributor module.

In order to provide a simple connection of a load circuit, a connection end of the first and possibly the second connection line is preferably accessible from the rear wall of the housing of the current distributor module or each current distributor module. In particular, the corresponding connection end is guided outwards in the process through the rear wall of the housing.

However, as an alternative thereto, it is also conceivable to guide the first and/or the second connection line out of the housing to the upper side or underside of the housing.

In one advantageous embodiment of the invention, plugging and detaching a circuit breaker onto or from the corresponding slot is facilitated due to the connection socket of the first connection line of the current distributor module or each current distributor module being held with play in the associated housing receptacle. In particular, manufacturing and fitting tolerances, which would generally make it considerably more difficult to push the circuit breaker on in the case of a rigid contact system, are therefore compensated for. The flexible hold of the connection socket in the housing is primarily advantageous if the current distributor is preferably constructed for a high current consumption, and the line and contact elements are correspondingly constructed to be solid and rigid.

In order to further improve the pluggability of a circuit breaker, provision is preferably made for the first connection line not to be completely rigid. Instead, a type of articulated joint is provided in the first connection line in the form of an in particular hose-shaped stranded connection. The connection socket is connected in a mechanically flexible manner to a rigid conductor element through the use of the articulated joint.

The current distributor optionally includes at least one signal path, through which a signal corresponding to the state of one or more circuit breakers can be interrogated. In order to form such a signal path, at least one current distributor module of the current distributor includes one or more signal conductors. The signal conductor or each signal conductor passes through the housing of the current distributor module substantially in the transverse direction and has a first contact element on one end side and a second contact element on the opposite end side. The first and the second contact elements are constructed to make contact with a corresponding signal conductor of a respectively adjacent current distributor module. In this case, the first and the second contact elements are preferably constructed to be complementary with respect to one another, i.e. to form a matching plug/socket pair. This means that, when a plurality of current distributor modules are disposed next to one another in a row, the corresponding signal conductors of the adjacent modules come into contact with one another and therefore one or more signal paths are closed which extend in the transverse direction over a plurality of current distributor modules or even the entire length of the current distributor.

In order to make contact with a signal contact of a circuit breaker, at least one current distributor module includes at least one signal conductor, which has, in addition to a (first and/or second) contact element for the purpose of making contact with a signal conductor of an adjacent current distributor module, a connection contact, which corresponds to a contact opening of the slot. As a result of the modular construction of the current distributor, the signal path(s) can also be matched in a simple and flexible manner. In particular, signaling can be implemented either in a parallel-circuit or series-circuit embodiment or any desired combined form.

In order to make contact between a circuit breaker and the first main busbar in a simple manner which is resistant to high currents, provision is made for the first main busbar to have a number of contact receptacles, in particular contact holes, for the purpose of accommodating a plug-in contact of the circuit breaker. A contact receptacle in each case is aligned with the first contact opening of the slot of each current distributor module.

A particularly high current consumption is preferably achieved by the fact that the main busbar or each main busbar is in the form of a solid metal rail having a rectangular cross section. The area of the cross section in this case is expediently between 250 mm$^2$ and 700 mm$^2$. Given preferred dimensions, the main busbar or each main busbar has, in cross section, an extent of 20 mm×25 mm. The cross section thus preferably has an area of approximately 500 mm$^2$. The current feed into the main busbar or each main busbar takes place optionally to the left or the right of the current distributor modules disposed next to one another in a row. Alternatively, the current feed can also take place centrally between two blocks of current distributor modules. In the former case, the main busbar or each main busbar is preferably constructed for a total fed current of 600 A and, in the case of a central feed, for a total current of up to 1200 A. The current distributor is constructed for a rated load of up to a maximum of 125 A per current distributor module, and therefore per slot.

Other features which are considered as characteristic for the invention are set forth in the appended claims.

Although the invention is illustrated and described herein as embodied in a modular current distributor for high currents, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
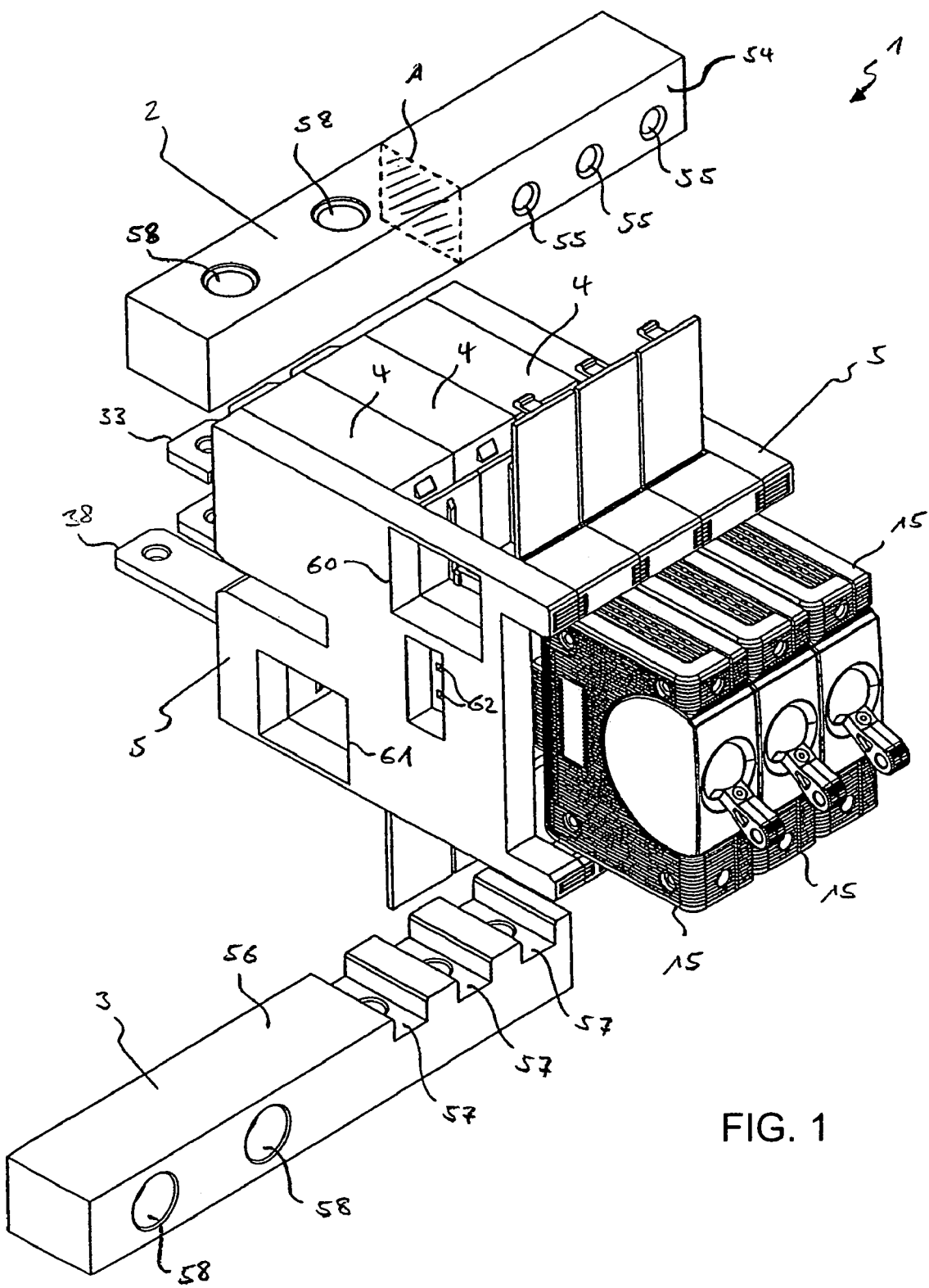
FIG. 1 is a diagrammatic, exploded, perspective view of a current distributor having a first main busbar as a common current feed, a second main busbar as a common outgoing current line and three current distributor modules for the purpose of branching off current into one load circuit each.

Referring now in detail to the figures of the drawings, in which mutually corresponding parts and magnitudes are always provided with the same reference symbols, and first, particularly, to FIG. 1 thereof, there is seen a current distributor 1 in an exploded illustration, including a first main busbar 2 as a common current supply or current feed, and a second main busbar 3 as a common outgoing current line.

The current distributor 1 furthermore includes three current distributor modules 4, each of which is used for branching off current from the first main busbar 2 to a load circuit and feeding back the current from the load circuit into the second main busbar 3. The three current distributor modules 4 are attached to one another at their end side. A block formed by the three current distributor modules 4, which are disposed next to one another in a row, is closed off from the outside by a termination plate 5 at the end.

Figure 2:
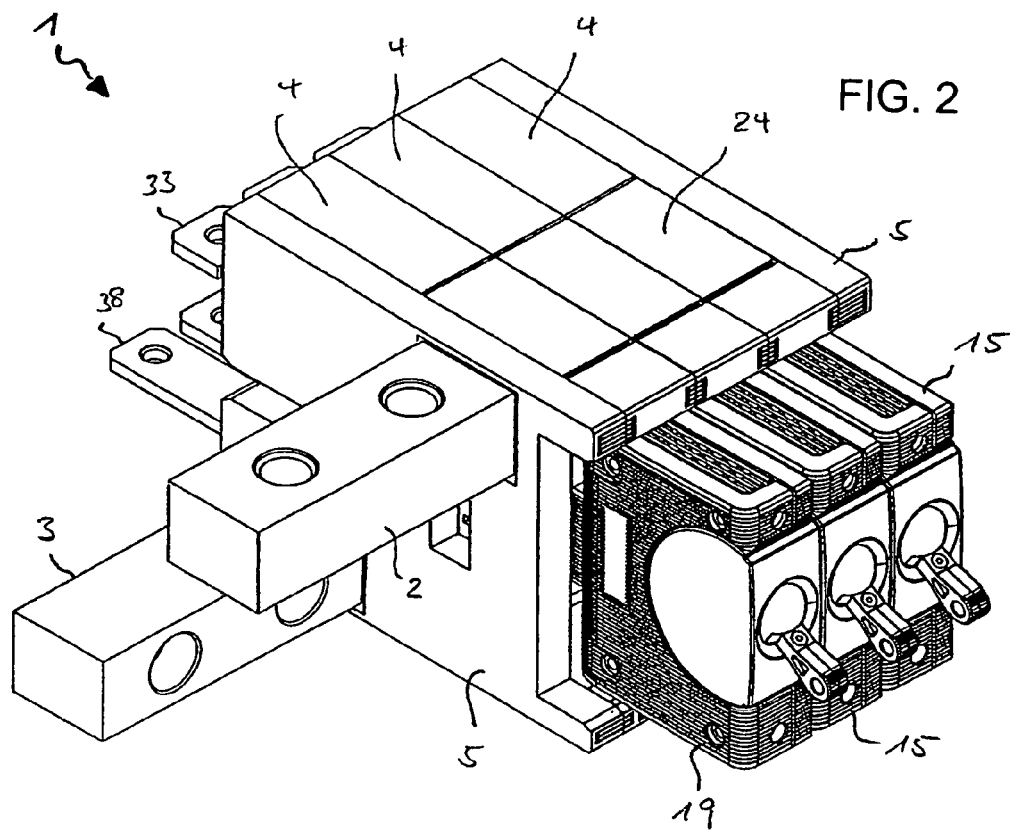
FIG. 2 is a perspective view of the current distributor shown in FIG. 1 with main busbars inserted into the current distributor modules.

FIG. 2 illustrates the current distributor 1 with the main busbars 2 and 3 inserted into the current distributor modules 4.

Figure 3:
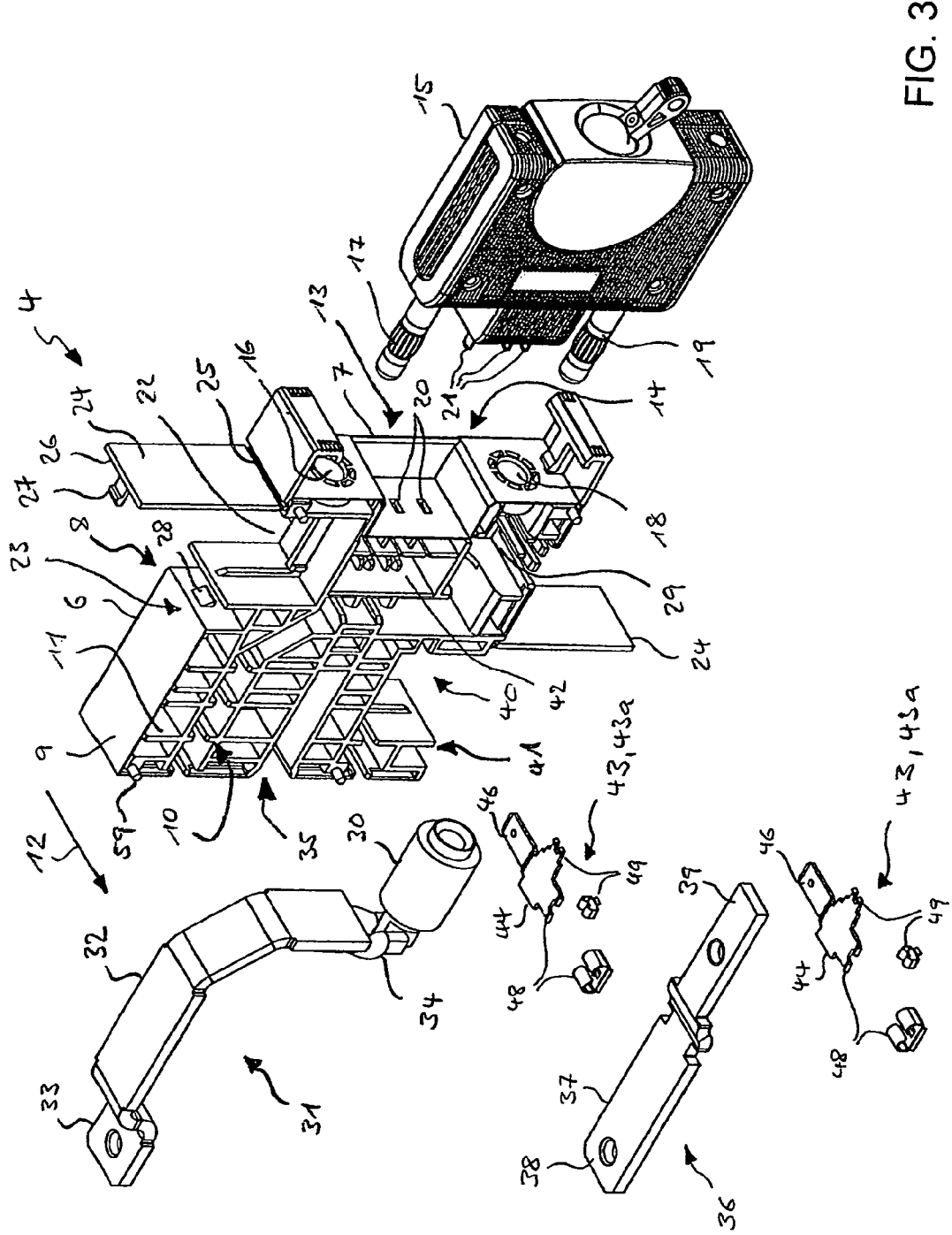
FIG. 3 is an exploded, perspective view of a current distributor module of the current distributor shown in FIG. 1.

A current distributor module 4 is illustrated in more detail in the exploded illustration of FIG. 3. As can be seen from this illustration, the current distributor module 4 includes a flat housing 6 being formed of an insulating material, in particular plastic. The housing 6 is in the form of a shell and has a housing base 7 (largely hidden in the illustration shown in FIG. 3), which substantially covers an end side 8 of the housing (referred to below merely as the end side) that faces away in the perspective view of FIG. 3. Housing side walls 9 protrude at right angles from the housing base 7, and therefore in the direction of an opposite (housing) end side 10. Furthermore, the housing 6 is reinforced by intermediate walls 11, which likewise protrude at right angles from the housing base 7 and are connected in the form of a grid. The housing 6 is open at the end side 10 remote from the housing base 7. In other words, the housing 6 formed from the housing base 7, the housing side walls 9 and the intermediate walls 11 has a structure in the form of a letter case. The direction of extent of the housing side walls 9 and the intermediate walls 11, which is at right angles to the housing base 7, is also referred to as a transverse direction 12.

A slot 14 for a circuit breaker 15 is formed in a narrow side of the housing 6, which is provided as a front side 13 of the housing. The slot 14 has a first contact opening 16 for a first plug-in contact 17 (preferably in the form of a lamellar plug or pin plug) of the circuit breaker 15 and a second contact opening 18 for a second plug-in contact 19 (preferably likewise in the form of a lamellar plug or pin plug) of the circuit breaker 15. The slot 14 is also provided with three further contact openings 20 for corresponding signal contacts 21 (preferably in the form of flat plugs) of the circuit breaker 15.

The first contact opening 16 opens out into a first channel 22, which completely passes through the housing 6 in the transverse direction 12 and is provided for the purpose of accommodating the first busbar 2. The first channel 22 is disposed on an upper side 23 of the housing 6 and is open towards this upper side 23 in the illustration shown in FIG. 3. A cover 24 is provided in order to be able to cover the channel 22 if required. The cover 24 is in the form of a hinged cover plate and is fixed in such a way that it can move pivotably at one edge of the channel 22 through the use of a film hinge 25 on the housing 6. A free end 26 of the cover 24 has a hook-like latching element 27, through the use of which the cover 24 can be latched, in a state in which it is pivoted over the channel 22, to a corresponding abutment 28 of the housing 6. In this state, the cover 24 ends flat with the housing side wall 9 forming the upper side 23. The channel 22 is thereby covered.

The second contact opening 18 of the slot 14 opens out into a housing receptacle 29, which is provided for the purpose of accommodating a connection socket 30 for the plug-in contact 19 of the circuit breaker 15. The connection socket 30 is part of a first connection line 31. This connection line 31 furthermore includes a rigid conductor element 32, which is bent approximately in the form of an L and has a connection end 33 for the purpose of connecting a load circuit on its side facing away from the connection socket 30. Electrical contact between the connection socket 30 and the conductor element 32 is produced by a stranded loop 34, which is soldered at its two respective ends to the connection socket 30 and the conductor element 32 in the region of the loop.

Figure 4:
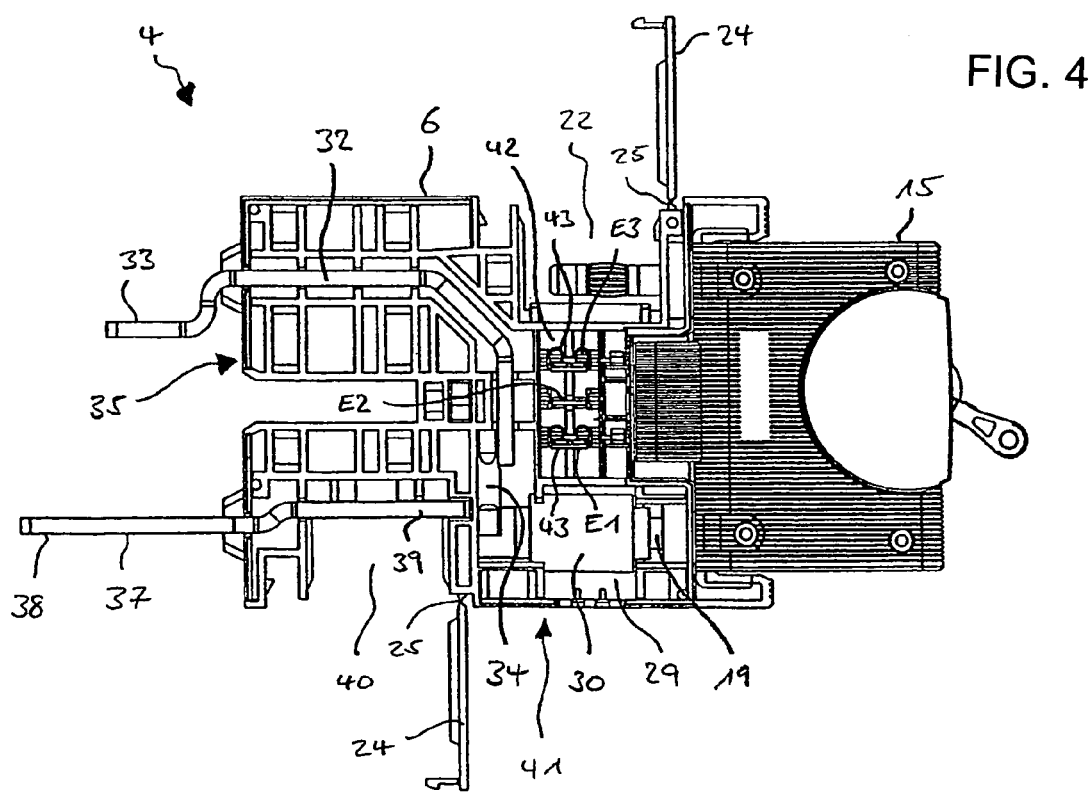
FIG. 4 is a side-elevational view of the current distributor module shown in FIG. 3.

As can be seen in particular from FIG. 4, on one hand, the conductor element 32 is fixed in position in the housing 6 in such a way that the connection end 33 of the conductor element 32 protrudes out of a rear wall 35 of the housing 6. On the other hand, the connection socket 30 rests with play in the associated housing receptacle 29. As a result of the mechanical flexibility of the stranded loop 34, the connection socket 30 can therefore move with respect to the housing 6 and the conductor element 32 which is fixed in position therewith. This flexible hold of the connection socket 30 is used for compensating for manufacturing tolerances and therefore improves the pluggability of the circuit breaker 15 into the slot 14, especially since the connection socket 30 matches the position of the corresponding plug-in contact 19 when the circuit breaker 15 is plugged on, as a result of which the circuit breaker 15 is prevented from being jammed or blocked.

As is shown in FIG. 3, in order to feed the current back out of the load circuit into the second main busbar 3, the current distributor module 4 includes a second connection line 36 which is formed from a rigid and substantially planar conductor element 37. As is seen in FIG. 4, the conductor element 37 is accommodated and fixed in position, in the housing 6, with the result that it protrudes with one connection end 38 from the rear wall 35 of the housing 6. An end 39 of the conductor element 37, which is opposite the connection end 38, is used for making contact with the second main busbar 3 and, for this purpose, is positioned in a second channel 40 of the housing 6 intended for accommodating the second main busbar 3. This second channel 40 is formed at a lower side 41 of the housing 6 and, in the state shown in FIGS. 3 and 4, is open towards this lower side 41. In turn, since the cover 24, which is in the form of a hinged cover plate, is fixed at one edge of the channel 40 to the housing 6 through the use of the film hinge 25, the channel 40 can also be covered by pivoting and latching the cover 24 on the housing 6.

The contact openings 20 of the slot 14 open out into a housing receptacle 42, which is disposed between the housing receptacle 29 and the channel 22, for a maximum number of three signal conductors 43. The signal conductors 43 are used for transmitting low-voltage signals which, for example, indicate the switching state of one or more circuit breakers 15.

Figure 5A:
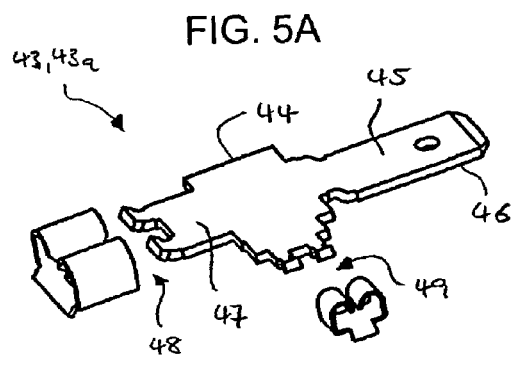
FIGS. 5A-5E are exploded, perspective views of five alternative variants of a signal conductor of the current distributor module shown in FIG. 4.
Figure 5D:
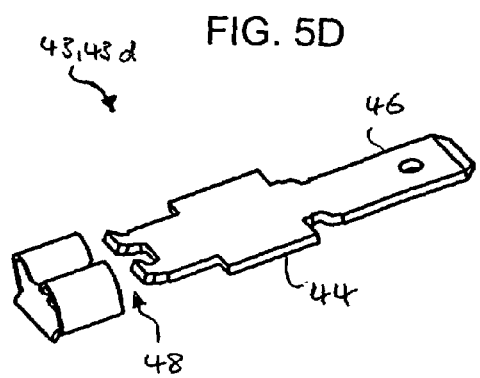
Figure 5B:
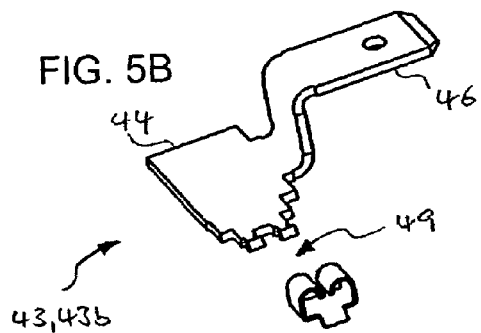
Figure 5E:
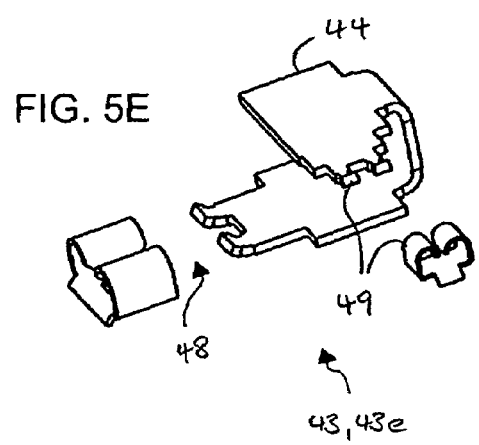
Figure 5C:
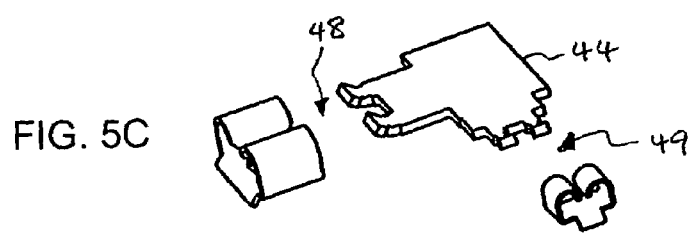

FIGS. 3 and 4 as well as an enlarged, fragmentary view shown in FIG. 5A, illustrate a first variant 43a of the signal conductor 43. The variant 43a includes a substantially planar conductor element 44 being formed of a metallic flat strip material. A first contact element 46 in the form of a flat plug is formed at one transverse end 45 of the conductor element 44. An opposite transverse end 47 of the conductor element 44 has a second contact element 48, which is in the form of a clamping shoe for a flat plug corresponding to the contact element 46. The contact elements 46 and 48 are therefore complementary to one another in particular in the form of a plug/socket pair. The conductor element 44 has a connection contact 49 between the contact elements 46 and 48. The connection contact 49 in turn is in the form of a clamping shoe for a flat plug and is used for making contact with a signal contact 21 of the circuit breaker 15.

As can be seen in particular from a combination of FIGS. 3 and 4, a signal conductor 43 can be disposed in the housing receptacle 42 in three planes E1, E2 and E3, each of which planes corresponds to a contact opening 20 of the slot 14. As is shown in FIGS. 3 and 4, the planes E1 and E3 are each occupied by a signal conductor 43, while no signal conductor is disposed in the plane E2.

The contact elements 46 and 48 are used for through-connecting of the signal conductor 43 with corresponding signal conductors 43 of adjacent current distributor modules 4. For this purpose, the contact element 46 is disposed at the end side 8, and the contact element 48 is disposed at the end side 10, of the current distributor module 4 and they are accessible from the outside. If there are two adjacent current distributor modules 4 on the same plane E1 to E3 and one signal conductor 43 is provided, the contact element 46 of one signal conductor 43 automatically makes contact with the contact element 48 of an adjacent current distributor module 4 when the current distributor modules 4 are joined together. In this manner, the signal conductors 43 of the current distributor modules 4 disposed next to one another in a row form a signal path P, which reaches over a plurality of current distributor modules 4, as is illustrated schematically, for example in FIG. 6.

Instead of the above-described variant 43a of the signal conductor 43, further variants 43b-43e of the signal conductor 43, which are depicted in FIGS. 5B to 5E, can optionally be inserted into the housing receptacle 42. In the variants 43b and 43c respectively shown in FIGS. 5B and 5C, in each case only one of the contact elements 46 or 48 and the connection contact 49 is provided. On one hand, the variant 43b illustrated in FIG. 5B also has the particular feature that the contact element 46 is bent out of the plane of the conductor element 44 so as to have the form of a gooseneck. It is thus possible for a signal path P'' to be provided which alternates between two planes E1, E2, E3 (see FIGS. 7 and 8). In the variant 43d, on the other hand, the connection contact 49 is omitted. When using this variant 43d, a signal path P''' can be bridged over the region of a current distributor module 4 without the associated contact opening 20 being occupied (see FIG. 8). Through the use of the variant 43e shown in FIG. 5E, a signal path P''' can finally be passed back in the opposite direction to the original signaling direction in an adjacent plane E1, E2, E3 (see FIG. 8).

Figure 6:
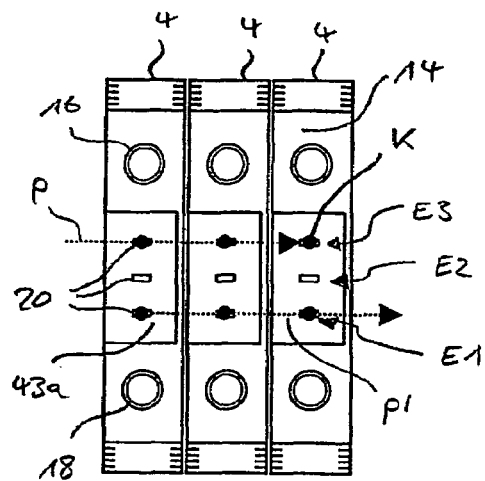
FIG. 6 is a front-elevational view of three current distributor modules, disposed next to one another in a row, of the current distributor shown in FIG. 1, with parallel signaling circuitry.
Figure 7:
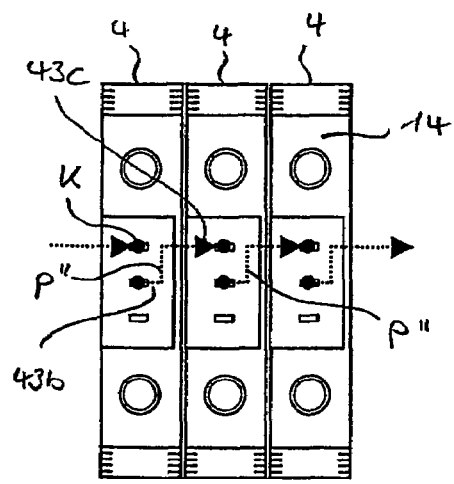
FIG. 7 is a view similar to FIG. 6 of the current distributor modules with series signaling.
Figure 8:
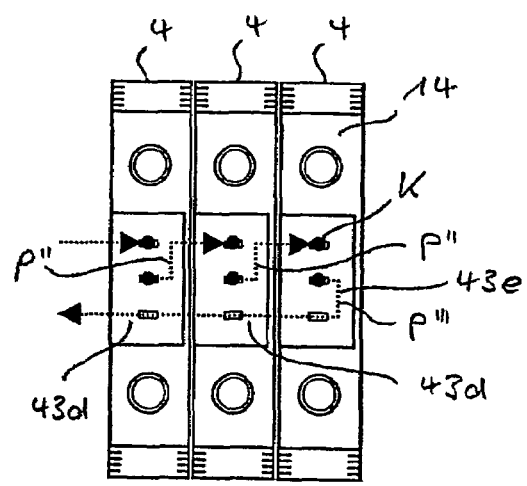
FIG. 8 is a view similar to FIG. 6 of the current distributor modules with series signaling circuitry and a fed-back signal path.

As is illustrated schematically in FIGS. 6 to 8, various signal paths P, P', P'', P''' can be provided by suitably installing the current distributor modules 4 next to one another in a row using the variants 43a-e of the signal conductor 43. FIGS. 6 to 8 each show three current distributor modules 4 disposed next to one another in a row in a front view, i.e. showing the slot 14, so that it is possible in particular to see the contact openings 20 disposed one above the other in the three planes E1, E2 and E3. A dotted line in each case indicates a signal path P, P', P'', P''', i.e. a conductive connection between two or more contact openings 20. A black dot K in the region of a contact opening 20 in this case indicates that the corresponding contact opening 20 has a connection contact 49 associated therewith.

The diagrammatic view illustrated in FIG. 6 corresponds to a configuration of the current distributor modules 4 shown in FIGS. 3 and 4. Each contact opening 20 of the plane E1 and each contact opening 20 of the plane E3 in this case has an associated signal conductor 43 of the variant 43a, with the result that the contact openings 20 of the plane E3, on one hand, and the contact openings 20 of the plane E1, on the other hand, are incorporated in one signal path P, P' in each case. In one alternative configuration of the current distributor modules 4 shown in FIG. 7, combining the variants 43b and 43c of the signal conductor 43 means that in each case a signal path P'' is formed between a contact opening 20 of the plane E2 and a contact opening 20, which is disposed in the plane E3, of an adjacent current distributor module 4. A modification of the last-mentioned signaling circuitry is illustrated in FIG. 8. In this case, while using a signal conductor 43 in the variant 43e, a signal path P''' starting from the contact opening 20, which is associated with the plane E2, of the last current distributor module 4 in the signaling direction is diverted into the plane E1, where the signal path P''' is passed back by the signal conductor 43 in the variant 43d along the current distributor modules 4, without the contact openings 20 lying on this path being occupied.

The signal contacts 21 are preferably wired within each circuit breaker 15 in such a way that the signal contact 21 corresponding to the plane E3 is short-circuited by the signal contact 21 corresponding to the plane E1 when the circuit breaker 15 is off and in such a way that the signal contact 21 corresponding to the plane E3 is short-circuited by the signal contact 21 corresponding to the plane E2 when the circuit breaker 15 is on. It is thus possible for the switching state of the circuit breaker 15 to be interrogated at the signal contacts 21 corresponding to the planes E1 and E2 by applying a signal voltage to the signal contact 21 corresponding to the plane E3.

In the circuitry shown in FIG. 6, the circuit breakers 15 are connected in parallel with respect to the signaling. If a signal voltage is applied to the signal path P, voltage is applied to the signal path P' when at least one of the plugged-on circuit breakers 15 is off.

As is shown in FIGS. 7 and 8, the circuit breakers 15 which have been plugged onto the current distributor modules 4 are connected in series in terms of signaling. The series-connected signal paths P'' and possibly P''' are interconnected precisely when all of the slots 14 are occupied with circuit breakers 15 and all of the circuit breakers 15 are on.

The two main busbars 2 and 3 are in the form of substantially solid copper rails having a rectangular cross section A (FIG. 1). Each main busbar 2, 3 is constructed for a current consumption of 600 A. The cross section A of each main busbar 2, 3 preferably has dimensions of approximately 20 mm×25 mm, and therefore an area of approximately 500 mm$^2$.

The first main busbar 2 is provided on its front side 54 with a number of holes 55 (FIG. 1), each of which is used as a contact socket for the plug-in contact 17 of a circuit breaker 15. A number of grooves 57 are introduced into an upper side 56 of the second main busbar 3, each of which grooves is intended to be used as a receptacle for the end 39 of a conductor element 37. In order to produce good electrical contact, provision is made for the end 39 of each conductor element 37 to be screwed into the associated groove 57. In addition, each main busbar 2, 3 has at least one screw termination 58 for the purpose of connecting a main current supply.

In order to install the current distributor 1, a number of current distributor modules 4 which corresponds to the number of load circuits to be connected are disposed next to one another in a row at the end, as shown in FIG. 1. In this case, the current distributor modules 4 are connected to one another detachably and in such a way that they are aligned through the use of guide journals 59 (FIG. 3), which are fitted to the end side 10 of each housing 6 and engage in corresponding non-illustrated receptacles on the end side 8 of an adjacent current distributor module 4. The open end side 10 of the housing 6 of a current distributor module 4 in this case is closed off by the housing base 7 of an adjacent current distributor module 4.

Subsequently, the main busbars 2 and 3 are inserted into the respective channels 22 and 40, which are open towards the respective upper side 23 and lower side 41. As a result, the holes 55 of the first main busbar 2 are positioned with respect to the current distributor modules 4 in such a way that in each case one hole 55 is aligned with the contact opening 16 of a slot 14. The grooves 57 of the second main busbar 3 are likewise positioned with respect to the current distributor modules 4 in such a way that the end 39 of a conductor element 37 in each case is inserted into a groove 57.

Once the conductor elements 37 have been screwed to the second main busbar 3, the covers 24, as shown in FIG. 2, are pivoted over the respective channel 22 or 40 and latched to the housing 6. In addition, the termination plates 5 are pushed onto the main busbars 2 and 3 and are connected to the respectively adjoining outer current distributor module 4. Each termination plate 5 is provided for this purpose with leadthroughs 60 and 61, which are respectively aligned with the channels 22 and 40 of the current distributor modules 4. Each termination plate 5 is furthermore provided with a number of openings 62, through which contact can be made with the signal conductors 43 of the adjacent current distributor module 4.

Once a circuit breaker 15 has been plugged onto a slot 14 of a current distributor module 4, the ends of a load circuit can be connected to the connection ends 33 and 38 of the current distributor module 4. That end of the load circuit which has been contact-connected to the connection end 33 in this case is connected to the main busbar 2 through the connection line 31 and the circuit breaker 15. That end of the load circuit which has been contact-connected to the connection end 38 is connected to the main busbar 3 through the connection line 36.

I claim:

1. A current distributor, comprising:
   a common, uninterrupted, main busbar serving as a main current supply;
   at least one current distributor module to be disposed in a row along said main busbar, said at least one current distributor module configured to be associated with at least one respective circuit breaker, and said at least one current distributor module having a connection line for supplying current to a load circuit, said connection line having a connection socket;
   said at least one current distributor module including a housing having a front side with a slot formed therein for plugging on a circuit breaker, a channel passing through said housing in a transverse direction, and a receptacle;
   said main busbar resting in said channel, said slot formed with a first contact opening enabling contact with said main busbar;
   said connection socket of said connection line resting in said receptacle of said housing, said slot formed with a second contact opening enabling contact with said connection socket of said connection line;
   said housing including a housing base defining a housing end side, said housing base substantially closing said housing end side, said housing including a plurality of housing side walls protruding from said housing base in said transverse direction, said housing including an open side opposite said housing base.

2. The current distributor according to claim 1, which further comprises another main busbar serving as a main outgoing current line, said at least one current distributor module having another channel passing through said housing in said transverse direction for accommodating said other main busbar, and another connection line being introduced into said other channel for feeding current back from the load circuit.

3. The current distributor according to claim 2, wherein said at least one current distributor module is at least two current distributor modules disposed next to one another in a row at end sides, said channels for said main busbar in said current distributor modules being aligned, and said other channels for said other main busbar in said current distributor modules being aligned.

4. The current distributor according to claim 2, wherein said connection lines each have a connection end accessible from outside a rear wall of said housing of said at least one current distributor module.

5. The current distributor according to claim 4, wherein said connection ends protrude outwardly from said rear wall.

6. The current distributor according to claim 1, wherein said first connection line of said at least one current distributor module has a connection socket accommodated with play in said receptacle of said housing.

7. The current distributor according to claim 6, wherein said first connection line of said at least one current distributor module has a rigid conductor element fixed in position in said housing and a stranded connection connected between said rigid conductor element and said connection socket in a mechanically flexible and electrically conducting manner.

8. The current distributor according to claim 1, wherein said at least one current distributor module includes at least one signal conductor having a first contact element disposed on an end side of said housing and a second contact element disposed on an opposite end side of said housing for making contact with a signal conductor of an adjacent current distributor module.

9. The current distributor according to claim 8, wherein said first contact element and said second contact element form a mutually complementary plug/socket pair.

10. The current distributor according to claim 1, wherein said at least one current distributor module includes at least one signal conductor having a contact element disposed on an end side of said housing for making contact with a signal conductor of an adjacent current distributor module and a connection contact corresponding to a further contact opening of said slot for making contact with a signal contact of a circuit breaker.

11. The current distributor according to claim 1, wherein said main busbar has a contact receptacle being aligned relative to said first contact opening of said slot of said at least one current distributor module.

12. The current distributor according to claim 2, wherein at least one of said main busbars is a solid metal rail having a rectangular cross section.

13. The current distributor according to claim 12, wherein said cross section of said at least one main busbar has an area of between 250 mm$^2$ and 700 mm$^2$.

14. The current distributor according to claim 2, which further comprises a termination plate placed onto an end side of said housing of said at least one current distributor module, said termination plate having at least one leadthrough aligned with at least one of said channels of said housing.

15. The current distributor according to claim 1, wherein said current distributor module includes a cover having a closed position covering said current distributor module and an open position uncovering said current distributor module and enabling said channel to be accessed.

16. The current distributor according to claim 15, wherein said cover is at least one hinged cover plate fixed to said housing by a film hinge.

17. The current distributor according to claim 15, wherein said cover is dimensioned to allow insertion of said main busbar into said channel when said cover is in said open position.

18. The current distributor according to claim 2, wherein said current distributor module includes a cover having a closed position covering said current distributor module and an open position uncovering said current distributor module and enabling said another channel to be accessed.

19. The current distributor according to claim 18, wherein said cover is dimensioned to allow insertion of said another main busbar into said another channel when said cover is in said open position.

* * * * *